United States Patent
Sasajima

(10) Patent No.: US 11,597,083 B2
(45) Date of Patent: Mar. 7, 2023

(54) ROBOT APPARATUS, ROBOT SYSTEM, CONTROL METHOD OF ROBOT APPARATUS, PRODUCT MANUFACTURING METHOD USING ROBOT APPARATUS, AND STORAGE MEDIUM

(71) Applicant: CANON KABUSHIKI KAISHA, Tokyo (JP)

(72) Inventor: Kenta Sasajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 16/709,725

(22) Filed: Dec. 10, 2019

(65) Prior Publication Data
US 2020/0189102 A1 Jun. 18, 2020

(30) Foreign Application Priority Data

Dec. 17, 2018 (JP) .............................. JP2018-235920
Oct. 30, 2019 (JP) .............................. JP2019-197994

(51) Int. Cl.
| | |
|---|---|
| *B25J 9/16* | (2006.01) |
| *B25J 9/00* | (2006.01) |
| *B25J 5/00* | (2006.01) |
| *B25J 15/00* | (2006.01) |

(52) U.S. Cl.
CPC ............ *B25J 9/1664* (2013.01); *B25J 5/007* (2013.01); *B25J 9/0096* (2013.01); *B25J 9/163* (2013.01); *B25J 9/1694* (2013.01); *B25J 15/00* (2013.01)

(58) Field of Classification Search
CPC ........ B25J 9/1664; B25J 5/007; B25J 9/0096; B25J 9/163; B25J 9/1694; B25J 15/00; B25J 9/0018; B25J 9/1641; B25J 15/0095; B25J 1/12; B25J 9/0009; B25J 9/162; B25J 9/1623; B25J 9/0087; B25J 9/1682; B25J 9/026; G05B 2219/39195; G05B 2219/40298; G05B 2219/45099; G05B 2219/49176; G05B 2219/37434; G05B 2219/37435; G05B 2219/37517; G05B 2219/39241; G05B 2219/42077; G05B 2219/49048

See application file for complete search history.

(56) References Cited

U.S. PATENT DOCUMENTS

| | | | |
|---|---|---|---|
| 10,618,164 B2 * | 4/2020 | Wang ...................... | B25J 9/163 |
| 2014/0039678 A1 * | 2/2014 | Motoyoshi ............. | B25J 9/1641 |
| | | | 700/258 |
| 2017/0212508 A1 * | 7/2017 | Kobori ..................... | B25J 15/08 |

(Continued)

FOREIGN PATENT DOCUMENTS

| | | | |
|---|---|---|---|
| JP | 6-278080 A | 10/1994 | |
| JP | 2000-141256 A | 5/2000 | |

(Continued)

*Primary Examiner* — Abby Y Lin
*Assistant Examiner* — Esvinder Singh
(74) *Attorney, Agent, or Firm* — Canon U.S.A., Inc., IP Division

(57) ABSTRACT

A robot apparatus is provided on a stand and includes a control apparatus that controls the robot apparatus. The control apparatus calculates vibration generated on the stand based on model data of the stand and trajectory data of an operation of the robot apparatus and corrects the trajectory data based on the vibration.

20 Claims, 9 Drawing Sheets

(56) References Cited

U.S. PATENT DOCUMENTS

| | | | |
|---|---|---|---|
| 2018/0024572 A1* | 1/2018 | Kai | G05B 19/404 |
| | | | 318/615 |
| 2018/0281182 A1* | 10/2018 | Yokota | B25J 9/1633 |
| 2019/0138009 A1* | 5/2019 | Saito | G05D 1/0231 |
| 2020/0171658 A1* | 6/2020 | Kielsholm Thomsen | |
| | | | B25J 9/1664 |
| 2021/0291362 A1* | 9/2021 | Pivac | F16F 7/1005 |

FOREIGN PATENT DOCUMENTS

| | | |
|---|---|---|
| JP | 2006-98356 A | 4/2006 |
| JP | 2011-104733 A | 6/2011 |
| JP | 2017-124455 A | 7/2017 |
| JP | 2018-001370 A | 1/2018 |
| JP | 2018-171665 A | 11/2018 |

\* cited by examiner

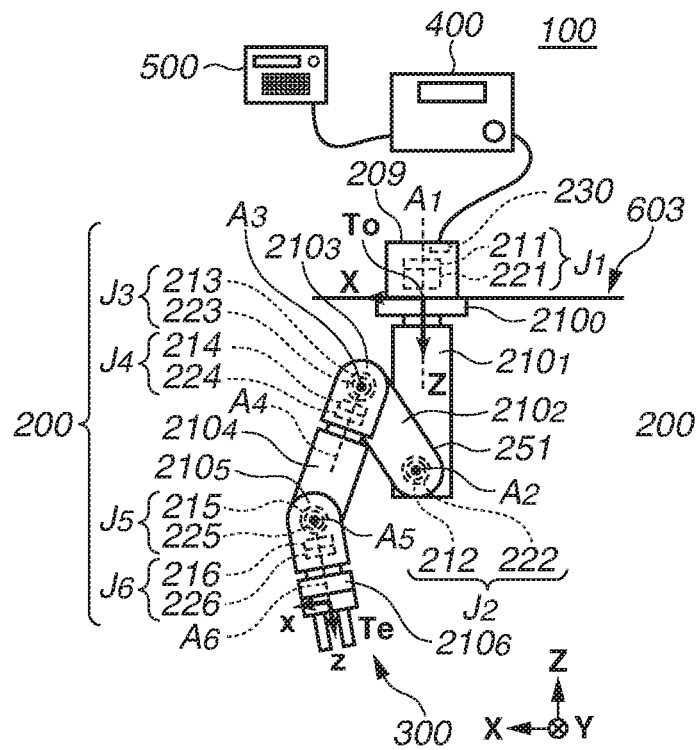
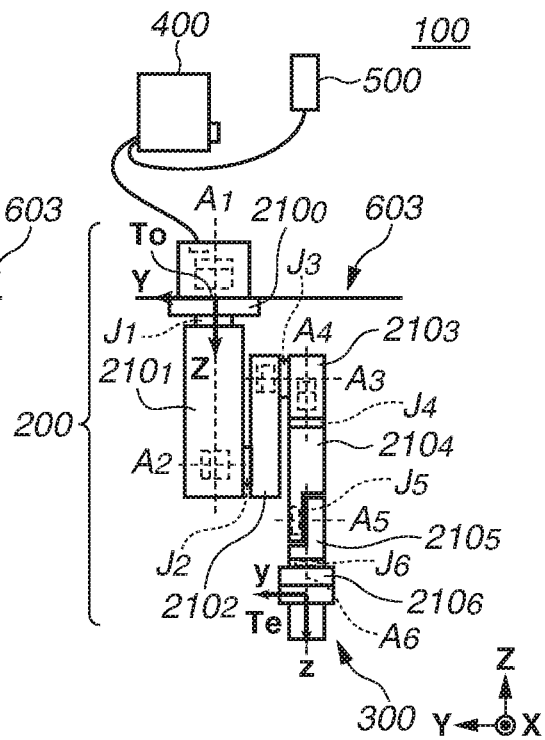
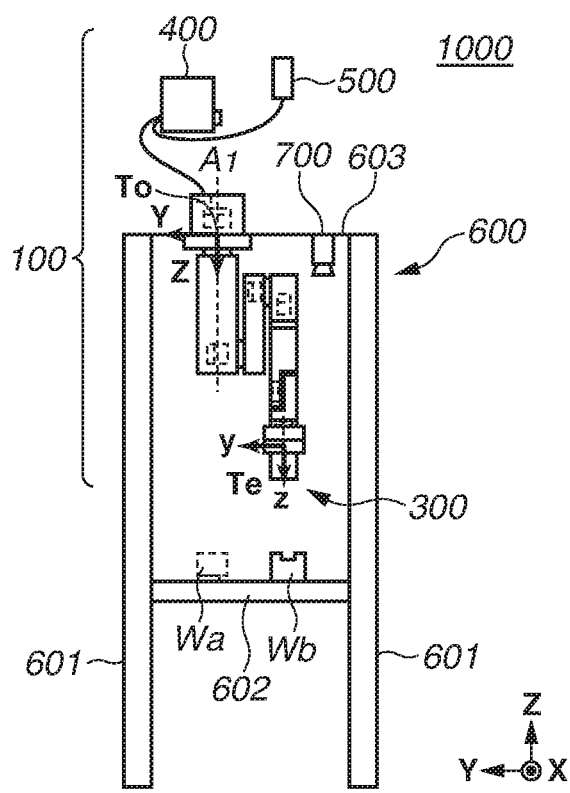

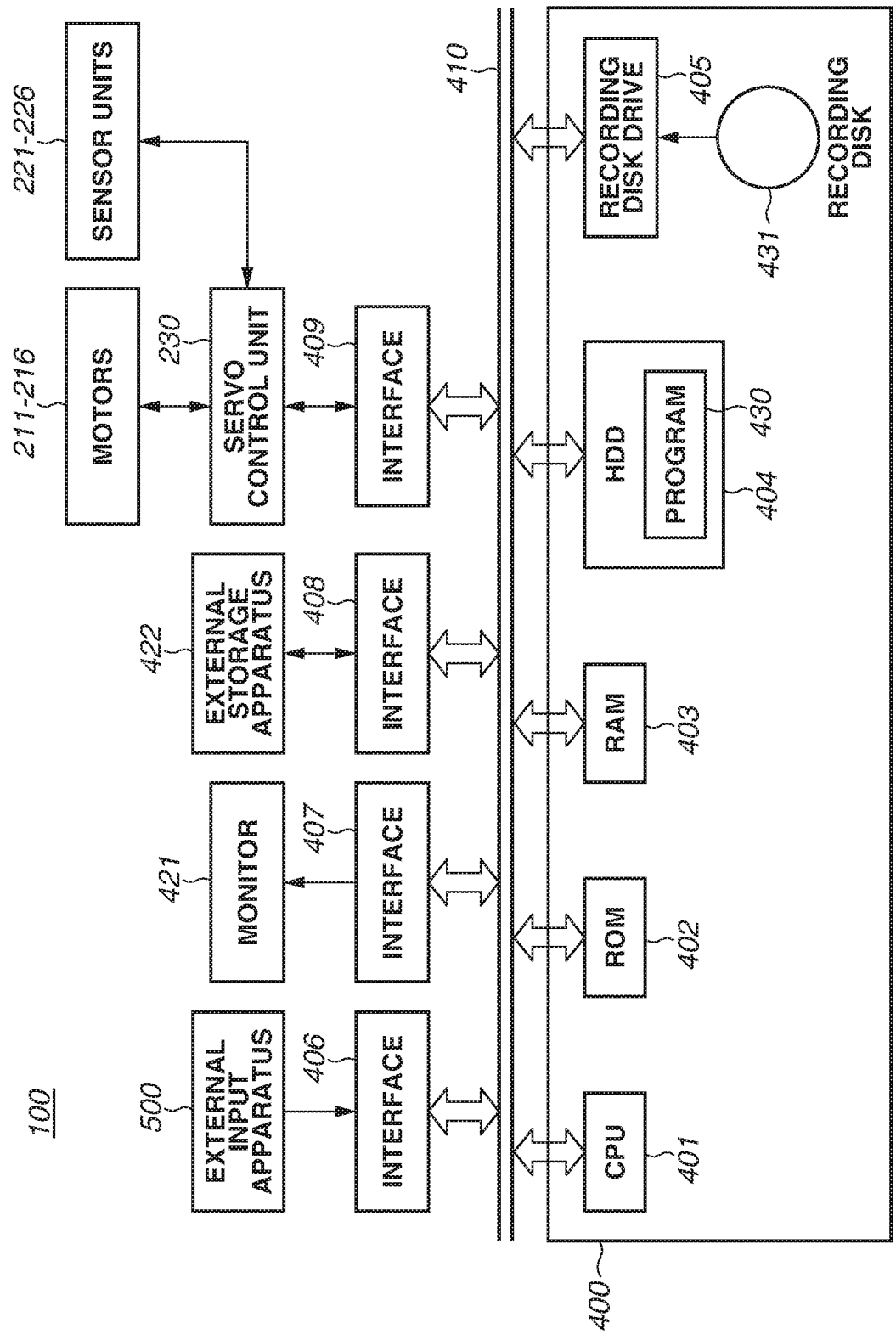

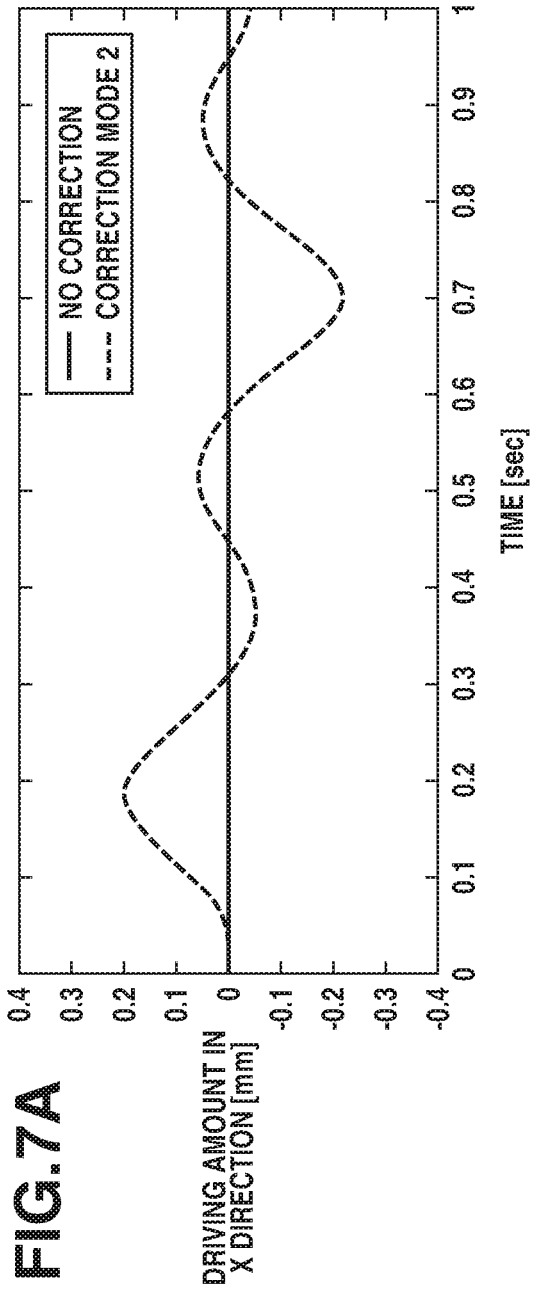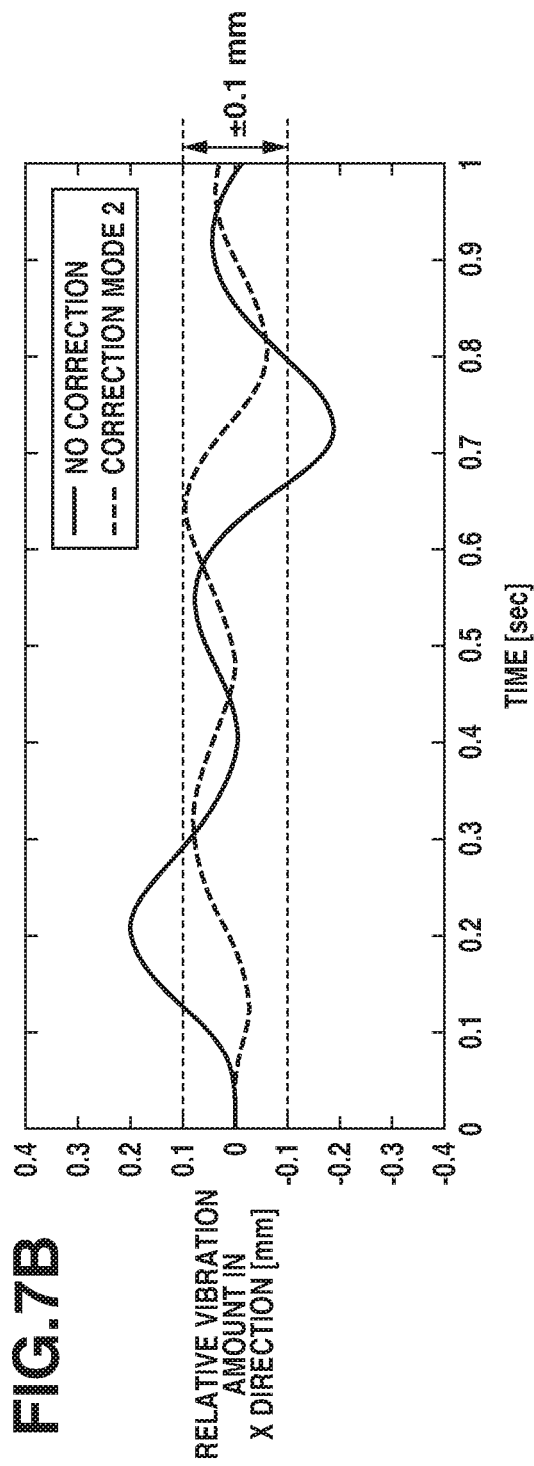

ROBOT APPARATUS, ROBOT SYSTEM, CONTROL METHOD OF ROBOT APPARATUS, PRODUCT MANUFACTURING METHOD USING ROBOT APPARATUS, AND STORAGE MEDIUM

BACKGROUND

Field

The present disclosure relates to a robot apparatus.

Description of the Related Art

Currently, to save manpower and promote automation at production sites in various industries, a cellular robotic system in which a robot apparatus such as an articulated robot arm is mounted on a stand or the like is widely used in factories, etc. Particularly in recent years, due to the declining birthrate and the increasing labor costs, automation of production has been accelerated. Also, it has been desired to increase the number of robot systems installed in a factory by efficiently using a limited space in the factory so as to improve productivity.

Accordingly, to save space for the robot system, there is a demand for a stand having lower rigidity and a smaller size, as a stand on which the robot apparatus of the robot system is mounted.

However, since a shorter cycle time is desired for the robot system used in production in view of the productivity, the robot apparatus needs to be operated at high speed and with high acceleration and deceleration capabilities. Consequently, high load is applied on a portion such as the stand on which the robot apparatus is mounted. If the stand has a smaller size, the stand significantly vibrates, thereby affecting the control of the robot apparatus.

In a robot discussed in Japanese Patent Application Laid-Open No. 2011-104733, individual inertial sensors that can measure inertial force are provided on a hand of the robot and on a stand. The amount of vibration generated between the hand of the robot and the stand is obtained by using these inertial sensors, and the robot is operated such that the amount of vibration generated between the hand of the robot and the stand is corrected. In this way, even if the stand vibrates due to the high operation speed of the robot, a relative position between the hand of the robot and the stand can be maintained, the vibration of the stand can thus less affect the control of the robot.

According to Japanese Patent Application Laid-Open No. 2011-104733, when vibration is generated on the robot or the stand, the robot detects the vibration by using the inertial sensors and reduces the vibration. In other words, the impact of the vibration is reduced by feedback control.

However, in view of the control bandwidth of a robot apparatus, it is difficult to sufficiently reduce the impact of vibration by the vibration reduction method using the feedback control. If the vibration is generated at a portion such as a stand where the robot is mounted at a higher frequency than that of the control bandwidth of the robot apparatus, the feedback control to reduce the generated vibration is delayed. If the vibration is not sufficiently reduced, an operation using the robot apparatus could not be performed accurately.

SUMMARY

The present disclosure is directed to providing a robot apparatus that can reduce the impact of vibration at a portion where the robot apparatus is mounted.

A robot apparatus is provided on a stand and includes a control apparatus that controls the robot apparatus. The control apparatus calculates vibration generated on the stand based on model data of the stand and trajectory data of an operation of the robot apparatus and corrects the trajectory data based on the vibration.

Further features of the present disclosure will become apparent from the following description of exemplary embodiments with reference to the attached drawings.

BRIEF DESCRIPTION OF THE DRAWINGS

FIGS. 1A-1C each illustrate a schematic configuration of a robot apparatus and a robot system according to a first exemplary embodiment.

FIG. 2 illustrates a block diagram of the robot apparatus according to the first exemplary embodiment.

FIGS. 7A and 7B are graphs illustrating effects achieved when a correction mode 2 according to the first exemplary embodiment is performed.

DESCRIPTION OF THE EMBODIMENTS

Figure 3:
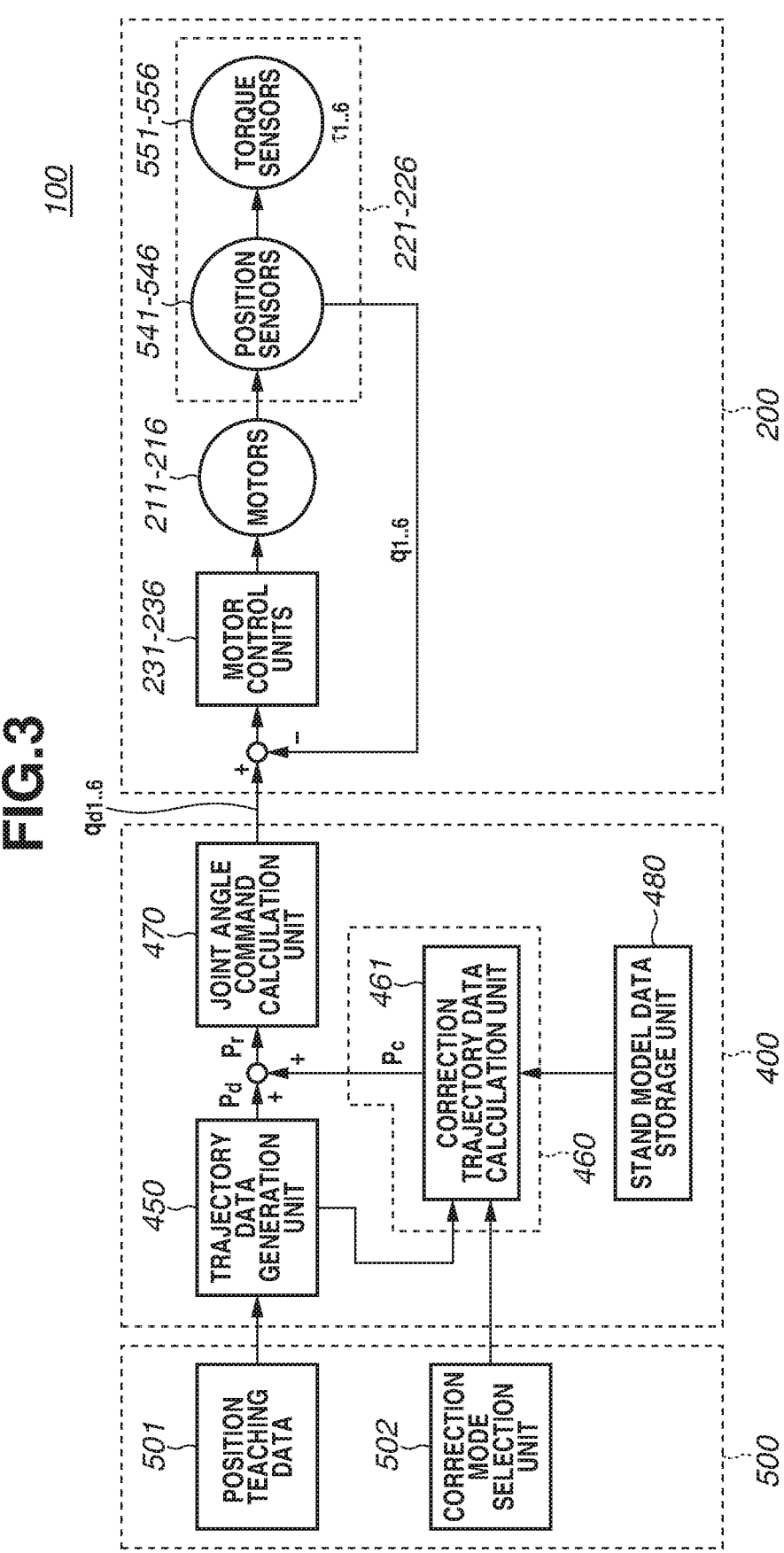
FIG. 3 illustrates a control block diagram of the robot apparatus according to the first exemplary embodiment.

Hereinafter, exemplary embodiments of the present disclosure will be described with reference to the attached drawings. The following exemplary embodiments are merely examples, and the configurations of the details can be changed as needed by those skilled in the art without departing from the spirit of the present disclosure. In addition, numeric values described in the exemplary embodiments are used for reference purposes, not to limit the present disclosure.

Hereinafter, a first exemplary embodiment will be described. FIGS. 1A to 1C are plan views of a robot apparatus 100 according to the present exemplary embodiment, when viewed from an arbitrary direction in an XYZ-coordinate system. FIG. 1A illustrates an XZ plan view, and FIG. 1B illustrates a YZ plan view. FIG. 1C illustrates a robot system 1000 in which the robot apparatus 100 is mounted on a stand 600. In the FIGS. 1A to 1C, arrows X, Y and Z represent the coordinate system of the entire robot system 1000. In general, when a robot system is represented by using the XYZ three-dimensional coordinate system, a local coordinate system may be used as needed for a robot hand, a finger, etc. due to the corresponding control, other than a global coordinate system used for the installation environment as a whole. In the present exemplary embodiment, the coordinate system of the entire robot system 1000 is represented by XYZ, and the local coordinate system is represented by xyz.

As illustrated in FIGS. 1A and 1B, the robot apparatus 100 includes an articulated robot arm body 200, a robot hand body 300, and a control apparatus 400 that controls operations of the robot arm body 200 and the robot hand body 300.

The robot apparatus 100 further includes an external input apparatus 500 as a teaching apparatus that transmits teaching data to the control apparatus 400. Examples of the external input apparatus 500 include a teaching pendant. An operator uses the teaching pendant to specify operations of the robot arm body 200 and the robot hand body 300.

In the present exemplary embodiment, the robot arm body 200 is a vertically articulated body. While the following description will be provided assuming that a robot hand is provided at an end portion of the robot arm body 200 as an end effector, the configuration is not limited thereto. A tool or the like may alternatively be provided as the end effector.

A link $210_0$, which is a base end of the robot arm body 200, is attached and fixed to a base 209 such that the base 209 is embedded in a top plate 603. In the present exemplary embodiment, while the robot arm body 200 is oriented vertically downward (in the –Z direction), the orientation may be changed depending on the use case.

The robot hand body 300 grasps a target object such as a part or a tool. The robot hand body 300 according to the present exemplary embodiment opens or closes two finger portions based on operation of a drive mechanism (not illustrated) to release and grasp the target object. Any operation is applicable as long as the robot hand body 300 is able to grasp the target object while maintaining a relative position of the target object with respect to the robot arm body 200.

The robot arm body 200 has a plurality of joints, for example, six joints (six axes). The robot arm body 200 has a plurality of (six) servomotors 211 to 216 that rotate joints $J_1$ to $J_6$ around rotation axes $A_1$ to $A_6$, respectively.

The robot am body 200 includes a plurality of links $210_0$ to $210_6$ that is rotatably connected by the joints $J_1$ to $J_6$, respectively. The links $210_0$ to $210_6$ are connected in series in this order from the base end toward the end portion of the robot arm body 200. The robot arm body 200 can orient an end effector (the robot hand body 300) of the robot arm body 200 to an arbitrary three-directional posture at an arbitrary three-dimensional position within its movable range.

The position and orientation of the robot arm body 200 can be expressed by using coordinate systems. A coordinate system To in FIGS. 1A to 1C represents a coordinate system fixed at the base end of the robot arm body 200, i.e., the link $210_0$. A coordinate system Te represents a coordinate system fixed at the hand (the robot hand body 300) of the robot arm body 200.

In the present exemplary embodiment, when the robot hand body 300 is not grasping any object, the hand of the robot arm body 200 signifies the robot hand body 300. When the robot hand body 300 is grasping an object, the robot hand body 300 including the object grasped thereby (for example, a part or a tool) signifies the hand of the robot arm body 200. That is, the robot hand body 300, which is the end effector, refers to the hand of the robot arm body 200 regardless of whether the robot hand body 300 is grasping an object or not.

The joints $J_1$ to $J_6$ include the servomotors 211 to 216 and sensor units 221 to 226 respectively connected to the servomotors 211 to 216. The sensor units 221 to 226 include position sensors (angle sensors) that detect the positions of the rotation axes of the respective servomotors. The sensor units 221 to 226 also include torque sensors that detect torque generated at the respective joints $J_1$ to $J_6$.

In addition, the joints $J_1$ to $J_6$ have respective speed reducers (not illustrated) and are connected to the links $210_0$ to $210_6$ driven at the respective joints, directly or via conveyance members such as belts and bearings not illustrated.

A servo control unit 230 serving as a drive control unit that controls driving of the servomotors 211 to 216 is arranged inside the base 209.

The servo control unit 230 controls driving of the servomotors 211 to 216 based on torque command values inputted for the respective joints $J_1$ to $J_{16}$ by outputting a current to each of the servomotors 211 to 216 such that the torque of each of the joints $J_1$ to $J_6$ follows the corresponding torque command value.

In the present exemplary embodiment, while the servo control unit 230 is configured as a single control apparatus, the servo control unit 230 may be configured as an aggregation of a plurality of control apparatuses, each of which corresponds to one of the servomotors 211 to 216. In addition, according to the present exemplary embodiment, while the servo control unit 230 is arranged inside the base 209, the servo control unit 230 may be arranged inside the control apparatus 400.

With the above configuration, by folding at least one of the links of the robot arm body 200, the robot hand body 300 is allowed to move to an arbitrary position and perform desired work.

The robot system 1000 in FIG. 1C includes the robot apparatus 100 and the stand 600 to which the robot apparatus 100 is attached. The stand 600 is manufactured by assembling the top plate 603 and a work table 602, which serves as a placement table for a workpiece, to supporting pillars 601.

The robot apparatus 100 is suspended from the top plate 603, and the robot hand body 300 is provided at the end portion of the robot arm body 200 as the end effector.

The robot hand body 300 grasps a workpiece Wa placed on the work table 602 and assembles the workpiece Wa to a workpiece Wb to manufacture a product.

During the production, an image capturing apparatus 700 is used for examining the state of the workpiece and accurately measuring relative positions between the robot hand body 300 and the workpieces Wa and Wb.

As is the case with the robot arm body 200, the image capturing apparatus 700 is suspended from the top plate 603 and fixed to the stand 600.

FIG. 2 is a block diagram of the robot apparatus 100 according to the present exemplary embodiment. The control apparatus 400 connected to the robot apparatus 100 is configured of a computer and includes a central processing unit (CPU) 401 as a control unit (a processing unit).

The control apparatus 400 also includes a read-only memory (ROM) 402, a random access memory (RAM) 403, and a hard disk drive (HDD) 404 as storage units. The control apparatus 400 further includes a recording disk drive 405.

The CPU 401, ROM 402, the RAM 403, the HDD 404, and the recording disk drive 405 are connected to various interfaces 406 to 409 via a bus 410. A basic program such as a basic input output system (BIOS) is stored in the ROM 402. The RAM 403 is a storage device that temporarily stores various data such as results of arithmetic processing performed by the CPU 401.

The HDD 404 is a storage device that stores, for example, results of arithmetic processing performed by the CPU 401 and various data obtained from the outside. The HDD 404 also stores a program 430 for causing the CPU 401 to execute arithmetic processing. The CPU 401 executes each step of the robot control method based on the program 430 recorded (stored) in the HDD 404.

The recording disk drive 405 can read out various data, a program, etc. stored in a recording disk 431.

The external input apparatus 500 is connected to the interface 406. The CPU 401 receives teaching data from the external input apparatus 500 via the interface 406 and the bus 410.

The servo control unit 230 is connected to the interface 409. The CPU 401 obtains detection results from the sensor units 221 to 226 via the servo control unit 230, the interface 409, and the bus 410. In addition, the CPU 401 outputs the data of the torque command values of the respective joints at predetermined time intervals to the servo control unit 230 via the bus 410 and the interface 409.

A monitor 421 is connected to the interface 407. Various images are displayed on the monitor 421 under control of the CPU 401. The interface 408 is connectable to an external storage device 422, which is a storage unit such as a rewritable nonvolatile memory or an external HDD.

In the present exemplary embodiment, the HDD 404 is a computer-readable storage medium, and the program 430 is stored in the HDD 404. However, the configuration is not limited thereto. The program 430 may be stored in any type of storage medium, as long as the storage medium is a computer-readable storage medium.

For example, the ROM 402, the recording disk 431, or the external storage device 422 illustrated in FIG. 2 may be used as the storage medium for providing the program 430. More specifically, a flexible disk, a hard disk, an optical disk, a magneto-optical disk, a compact disc (CD)-ROM, a CD-recordable®, a magnetic tape, a nonvolatile memory, a ROM, or the like can be used as the storage medium.

FIG. 3 is a control block diagram of a control system of the robot apparatus 100 according to the present exemplary embodiment. The robot apparatus 100 is operated when the CPU 401 (FIG. 2) of the control apparatus 400 executes the program 430 (FIG. 2).

Position teaching data 501 illustrated in FIG. 3 is the target value of the position of the robot hand body 300, which is the hand of the robot arm body 200. An operator sets the target value of the position of the robot hand body 300 using the external input apparatus 500. The target value of the position of the robot hand body 300 may be stored in the ROM 402 in advance.

A correction mode selection unit 502 relates to a variable regarding selection of a correction mode. As will be described below, a correction mode is selected when the trajectory data of the robot apparatus 100 is corrected to reduce the vibration of the stand 600, which is generated when the robot apparatus 100 is operated. The operator selects the correction mode based on the content of an operation performed by the robot apparatus 100 and sets the selected correction mode by using the external input apparatus 500.

Alternatively, the contents of operations performed by the robot apparatus 100 may be previously stored in the ROM 402, and the correction mode may be automatically selected by referring to the previously stored contents of operations of the robot apparatus 100 to perform comparison.

According to the present exemplary embodiment, the correction modes include a mode in which the vibration of the stand 600 itself is reduced and a mode in which the relative vibration between the stand 600 and the robot hand body 300 is reduced. In addition, there is a mode in which the vibration of the stand 600 is not corrected.

By using the above, the external input apparatus 500 outputs the position teaching data and information about the correction mode to the CPU 401 of the control apparatus 400 based on an operation by the operator.

Next, a trajectory data generation unit 450, a correction trajectory data generation unit 460, and a joint angle command calculation unit 470 of the control apparatus 400 will be described.

The trajectory data generation unit 450 generates trajectory data $P_d$ in the coordinate system Te with respect to the robot hand body 300 based on the position teaching data 501. The trajectory data $P_d$ is generated by using a technique such as rapidly-exploring random trees (RRT). The term "trajectory data" used herein represents a displacement value of each of the joints $J_1$ to $J_6$ of the robot arm body 200 per control period.

The correction trajectory data generation unit 460 includes a correction trajectory data calculation unit 461 and receives the trajectory data $P_d$ generated by the trajectory data generation unit 450 and information about the correction mode from the correction mode selection unit 520.

The control apparatus 400 further includes a stand model data storage unit 480 that stores simulation model data of the stand 600. The correction trajectory data calculation unit 461 receives the model data of the stand 600 from the stand model data storage unit 480.

The correction trajectory data calculation unit 461 calculates correction trajectory data $P_c$ based on the trajectory data $P_d$ and the model data of the stand 600 in a selected correction mode. The correction trajectory data generation unit 460 will be described in detail below.

The joint angle command calculation unit 470 receives target trajectory data $P_r$ obtained by adding the trajectory data $P_d$ generated by the trajectory data generation unit 450 and the correction trajectory data $P_c$ generated by the correction trajectory data generation unit 460.

The joint angle command calculation unit 470 performs an inverse kinematic calculation on the target trajectory data. $P_r$ to obtain angle command values (position command values) $q_{d1}$ to $q_{d6}$ for the respective joints $J_1$ to $J_6$ and outputs the calculated angle command values $q_{d1}$ to $q_{d6}$ to the robot arm body 200.

Motor control units 231 to 236 provided at the joints $J_1$ to $J_6$ of the robot arm body 200, respectively, receive the angle command values (position command values) $q_{d1}$ to $q_{d6}$ from the control apparatus 400 and operate the servomotors 211 to 216.

The sensor units 221 to 226 include the position sensors (angle sensors) 541 to 546 and the torque sensors (torque detection units) 551 to 556, respectively. The position sensors 541 to 546 detect angles (positions) of the servomotors 211 to 216 or the joints $J_1$ to $J_6$, respectively.

In the present exemplary embodiment, the position sensors 541 to 546 directly detect the angles of the servomotors 211 to 216, and the angles are used as the position information. The angles $q_1$ to $q_6$ of the joints $J_1$ to $J_6$ can be obtained from the angles detected by the position sensors 541 to 546 based on a speed reduction ratio, etc. of a reduction gear (not illustrated). Therefore, the position sensors 541 to 546 function as position detection means that indirectly detects the angles $q_1$ to $q_6$ of the joints $J_1$ to $J_6$. The torque sensors 551 to 556 detect torque $\tau_1$ to $\tau_6$ of the joints $J_1$ to $J_6$, respectively.

The angles $q_1$ to $q_6$ detected by the sensor units 221 to 226 are fed back to the angle command values $q_{d1}$ to $q_{d6}$. In this way, the links of the robot arm body 200 can be controlled highly accurately.

Figure 4:
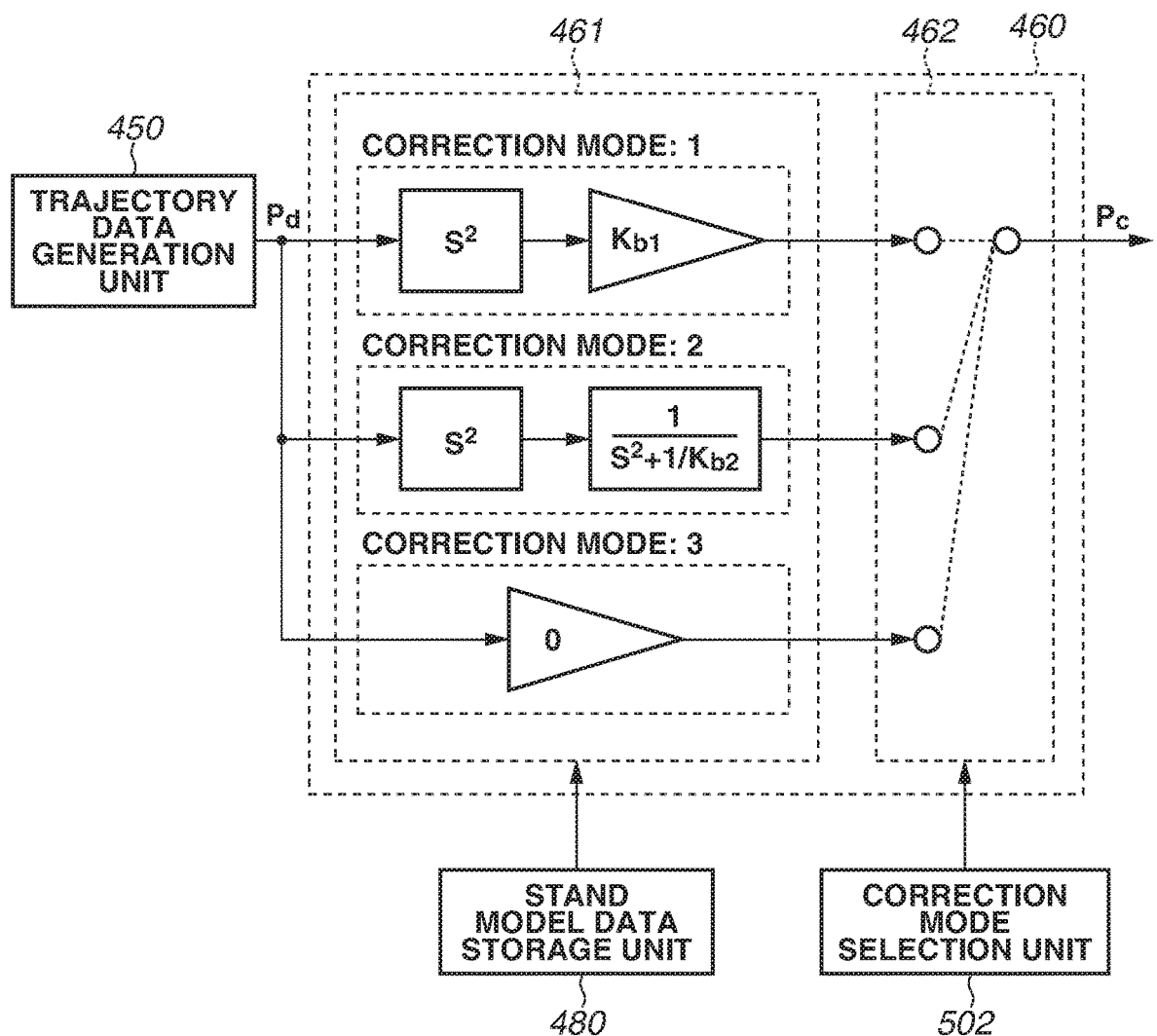
FIG. 4 illustrates a control block diagram of a correction trajectory data calculation unit in detail according to the first exemplary embodiment.

FIG. 4 is a control block diagram of the correction trajectory data generation unit 460 according to the present exemplary embodiment. The correction trajectory data generation unit 460 includes the correction trajectory data calculation unit 461 that calculates correction trajectory data and a correction mode switching unit 462 that switches the correction mode based on the information about the correction mode received from correction mode selection unit 502.

The correction trajectory data calculation unit 461 receives model data of the stand 600 from the stand model data storage unit 480. In the present exemplary embodiment, an elastic coefficient of the entire stand 600, a viscosity coefficient of the entire stand 600, a mass component value of the entire stand 600, and an installation orientation of the robot apparatus 100 are stored as model data of the stand 600.

In an arithmetic expression in the block diagram, s denotes a Laplace operator, 1/s denotes an integral operation, and s denotes a differential operation. The correction trajectory data generation unit 460 has a function of generating the correction trajectory data $P_c$ for reducing the impact of the vibration of the stand 600.

In the present exemplary embodiment, three correction modes are used. In a correction mode 1, the vibration of the stand 600 itself is reduced. In a correction mode 2, the impact of relative vibration between the stand 600 and the robot hand body 300 is reduced. In a correction mode 3, the vibration of the stand 600 is not corrected.

Next, an example of a method for generating the correction trajectory data $P_c$ in each correction mode will be described in detail.

First, in the correction mode 1, the correction trajectory data generation unit 460 generates correction trajectory data $P_c$ for controlling torsional vibration generated on the stand 600 when the robot arm body 200 is operated so as to reduce the vibration of the stand 600 itself.

More specifically, the correction trajectory data calculation unit 461 performs second-order differentiation on the trajectory data $P_d$ generated by the trajectory data generation unit 450 to calculate an acceleration component of the trajectory data $P_d$.

The correction trajectory data calculation unit 461 calculates a proportional gain $K_{b1}$ from the individual values of the entire stand 600 received from the stand model data storage unit 480 and multiplies the acceleration component of the trajectory data $P_d$ by the proportional gain $K_{b1}$. In this way, the correction trajectory data $P_c$ for reducing the torsional vibration of the stand 600 is obtained.

In the correction mode 2, the correction trajectory data generation unit 460 calculates a component of the vibration generated on the stand 600 when the robot arm body 200 is operated and generates correction trajectory data $P_c$ for operating the robot hand body 300 such that a relative position between the stand 600 and the robot hand body 300 is maintained.

In this way, even if the stand 600 vibrates, the relative positional relationship between the robot hand body 300 and the stand 600 can be maintained so as to reduce the impact of the relative vibration therebetween.

More specifically, the correction trajectory data generation unit 460 performs second-order differentiation on trajectory data $P_d$ generated by the trajectory data generation unit 450 to calculate an acceleration component of the trajectory data $P_d$.

Next, the correction trajectory data generation unit 460 calculates a proportional gain $K_{b2}$ from the individual values of the entire stand 600 received from the stand model data storage unit 480.

Next, by using a second-order transfer function consisting of the acceleration component of the trajectory data $P_d$ and the proportional gain $K_{b2}$, the correction trajectory data generation unit 460 calculates the correction trajectory data $P_c$ for operating the robot hand body 300 such that a relative position between the stand 600 and the robot hand body 300 is maintained.

In the correction mode 3, since the vibration of the stand 600 is not reduced, a value by which the trajectory data $P_d$ is multiplied is zero. The expression, correction trajectory data $P_c$=trajectory data $P_d$, is obtained thereby.

From the above correction modes, the correction mode selection unit 502 selects a correction mode. Next, correction trajectory data $P_c$ is generated by using the above correction method corresponding to the selected correction mode, and the generated correction trajectory data $P_c$ is input to the robot arm body 200.

Figure 5:
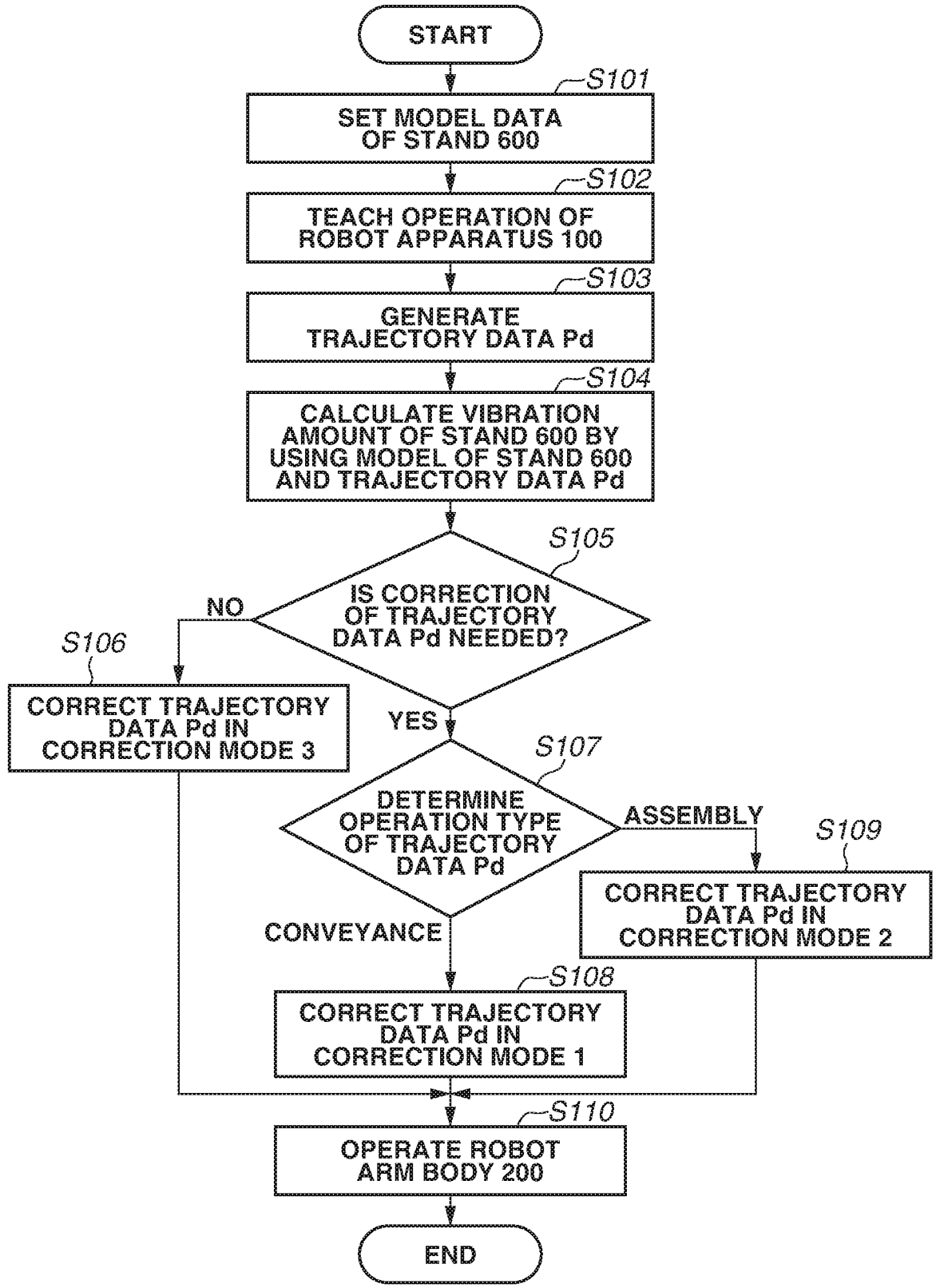
FIG. 5 illustrates a control flowchart according to the first exemplary embodiment.

Next, a control method for actually operating the robot system 1000 will be described in detail. FIG. 5 illustrates a flowchart of a control method according to the present exemplary embodiment.

As illustrated in FIG. 5, first, in step S101, model data of the stand 600 is set. The stand 600 according to the present exemplary embodiment has a portion that deforms by an operation of the robot apparatus 100. In the present exemplary embodiment, the operator sets the elastic coefficient of the entire stand 600, the viscosity coefficient of the entire stand 600, the mass component value of the entire stand 600, and the installation orientation of the robot apparatus 100. As needed, a simulation model of the robot system 1000 may be set by a computer-aided design (CAD) system or the like.

Next, in step S102, the operator teaches an operation of the robot apparatus 100. In the present exemplary embodiment, the operator teaches an operation of the robot apparatus 100 by using the external input apparatus 500. In this step, the operator also sets information about whether the operation is conveyance of workpieces or assembly of workpieces.

As described above, the operation of the robot apparatus 100 may be taught by creating teaching data by simulation software, etc. in advance and storing the created teaching data in the control apparatus 400. In such a case, too, information about whether the operation is conveyance of workpieces or assembly of workpieces is stored in association with the teaching data.

Next, the trajectory data $P_d$ of the robot arm body 200 is generated from the teaching information about the robot apparatus 100 taught in step S103. Since the method for generating the trajectory data $P_d$ has already been described above, the description thereof will be omitted.

Next, in step S104, by using the model data of the stand 600 and the trajectory data $P_d$, the amount of vibration that can be generated on the stand 600 when the robot arm body 200 is operated based on the trajectory data $P_d$ is estimated In the present exemplary embodiment, an amount of displacement of the entire stand 600 is set as the vibration amount. Acceleration and speed generated by the operation of the robot arm body 200 are calculated from the trajectory data $P_d$. The calculated acceleration and speed are to be applied to the stand 600.

Based on the elastic coefficient, the viscosity coefficient and the mass component value of the entire stand 600, and the acceleration and speed applied to the stand 600, an impedance control model is solved, and the amount of displacement of the entire stand 600 is calculated as the amount of vibration that can be generated on the stand 600 is calculated as the vibration amount.

Next, in step S105, the amount of displacement calculated in step S104 is compared with a predetermined value to determine whether the amount of displacement is equal to or greater than the predetermined value and then to determine whether the trajectory data $P_d$ needs to be corrected.

If the amount of displacement calculated in step S104 is equal to or greater than the predetermined value, i.e., it is determined that the trajectory data $P_d$ needs to be corrected (YES in step S105), the processing proceeds to step S107. In contrast, if the displacement calculated in step S104 is less than the predetermined value, i.e., it is determined that the trajectory data $P_d$ does not need to be corrected (NO in step S105), the processing proceeds to step S106.

In step S106, since no problem is caused when the robot arm body 200 is operated based on the current trajectory data $P_d$, the trajectory data $P_d$ is corrected in the above correction mode 3. Since in the correction mode 3, the trajectory data $P_d$ is directly input to the robot arm body 200 as the correction trajectory data $P_c$, the processing directly proceeds to step S110. In step S110, the robot arm body 200 is operated based on the trajectory data $P_d$, and the control flow is ended.

If the trajectory data $P_d$ needs to be corrected (YES in step S105), the processing proceeds to step S107. In step S107, the type of the operation based on the trajectory data $P_d$ is determined. To determine the operation type, the information about the operation type (whether the operation is conveyance or assembly) set in step S102 is referred. If the type of the operation based on the trajectory data $P_d$ is conveyance (CONVEYANCE in S107), the processing proceeds to step S108. If the type of the operation based on the trajectory data $P_d$ is assembly (ASSEMBLY in S107), the processing proceeds to step S109.

In step S108, the trajectory data $P_d$ is corrected in the above correction mode 1. Since the workpiece conveyance operation does not need a relative positional relationship between a workpiece grasped by the robot apparatus 100 and another workpiece, reduction of the absolute vibration of the stand 600 is needed.

In the correction mode 1, the trajectory data $P_d$ is corrected so as to reduce the absolute vibration of the stand. Consequently, when the workpiece is examined by using the image capturing apparatus 700 after the workpiece is conveyed, the workpiece can be examined without waiting for the vibration of the stand 600 to cease. Thus, the cycle time can be improved.

In step S109, the trajectory data $P_d$ is corrected in the above correction mode 2. The workpiece assembly operation needs a relative positional relationship between a workpiece grasped by the robot apparatus 100 and another workpiece. Therefore, it is more effective to reduce the relative vibration between the stand 600 and the robot hand body 300 by operating the robot arm body 200 such that the relative position between the grasped workpiece and the workpiece placed on the stand 600 is maintained.

In the correction mode 2, the trajectory data $P_d$ is corrected such that the relative vibration between the stand 600 and the robot hand body 300 is reduced. Consequently, even if the stand 600 vibrates due to high-speed assembly operation, the relative positional relationship between the grasped workpiece and the workpiece placed on the stand 600 can be maintained, the accuracy of the assembly operation can be ensured. In such a manner, since the assembly operation can be performed at high speed, the cycle time can be improved.

According to the present exemplary embodiment described above, regardless of the rigidity of the stand, the impact of the vibration of the stand generated by the operation of the robot apparatus can be effectively reduced, and the accuracy of the operation of the robot apparatus can be improved.

In addition, since the trajectory data is corrected in advance such that the vibration of the stand is reduced in a feed-forward manner, better responsiveness can be achieved, compared to the vibration reduction in a feed-back manner.

Next, how the vibration of the stand 600 is reduced will be described in detail by using simulations.

First, the correction mode 1 will be described in detail.

Figure 6A:
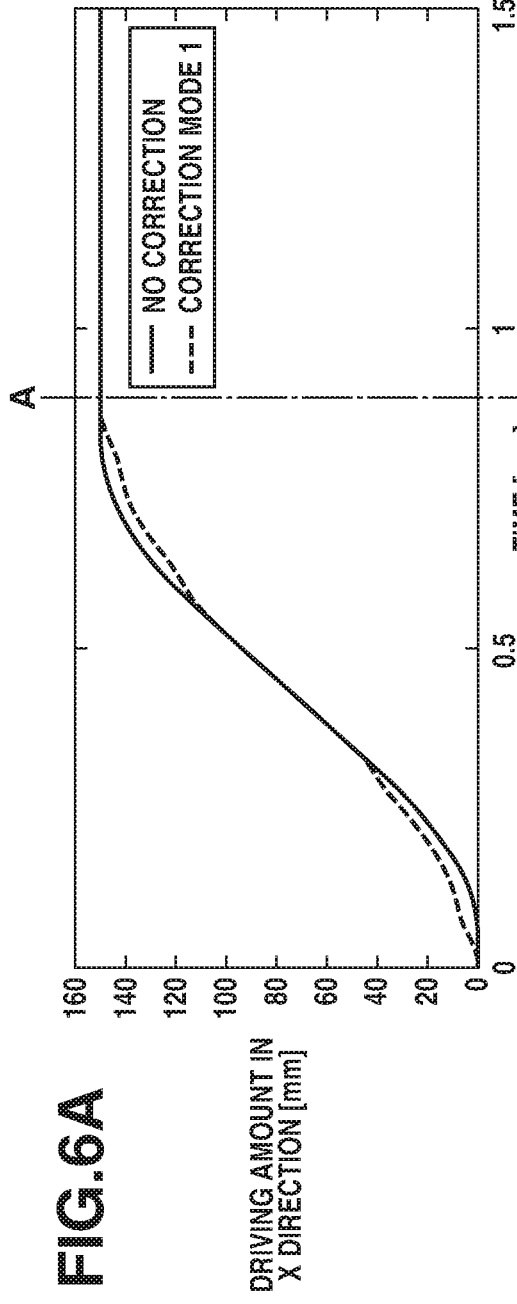
FIGS. 6A and 6B are graphs illustrating effects achieved when a correction mode 1 according to the first exemplary embodiment is performed.

FIG. 6A is a diagram illustrating a comparison made between a change in the position of the robot hand body 300 over time when the robot apparatus 100 is operated by using correction trajectory data $P_c$ corrected in the correction mode 1 according to the present exemplary embodiment and a change in the position of the robot hand body 300 over time without using the correction trajectory data $P_c$. The graph indicated by a solid line represents a case where the correction mode 1 is not used, and the graph indicated by a dashed line represents a case where the correction mode 1 is used. In FIG. 6A, the vertical axis represents the driving amount of the robot hand body 300 (the hand of the robot arm body 200) in the X direction, and the horizontal axis represents time.

Figure 6B:
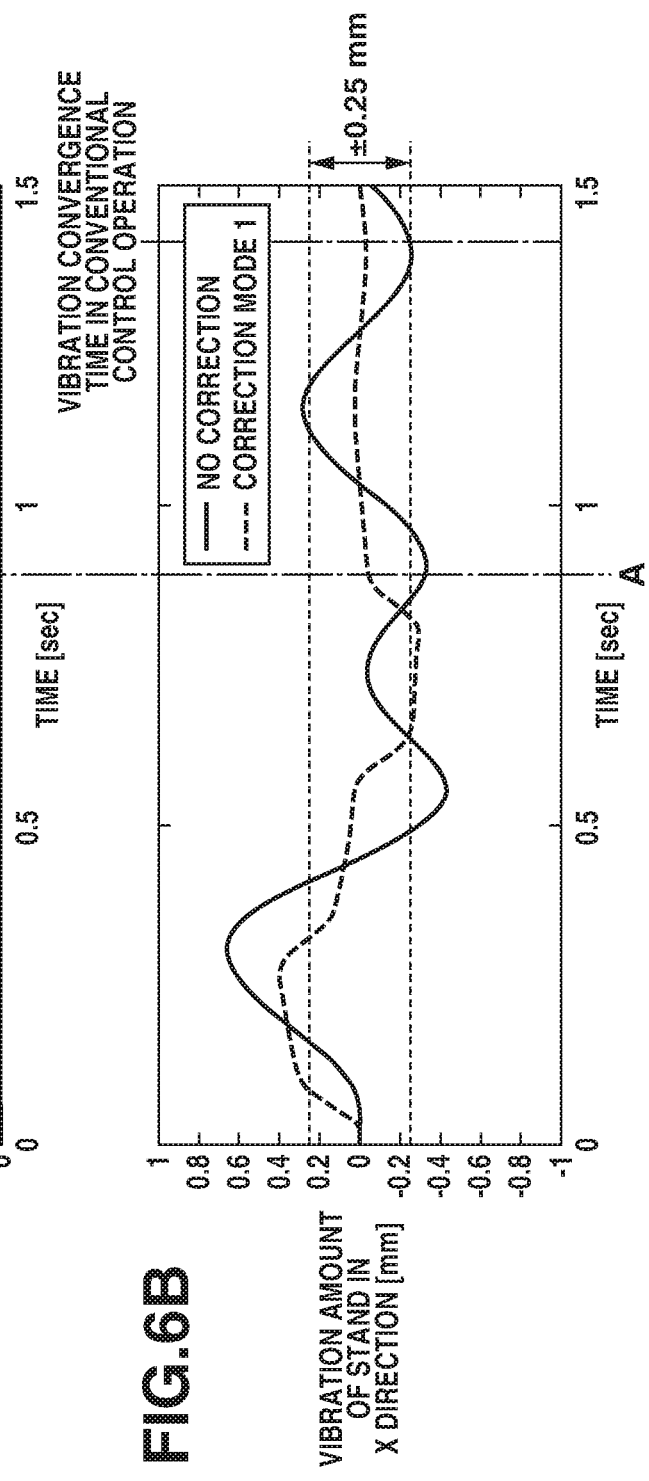

FIG. 6B is a diagram illustrating a comparison made between a vibration amount of the stand 600 when the robot apparatus 100 is operated by using correction trajectory data $P_c$ corrected in the correction mode 1 according to the present exemplary embodiment and a vibration amount of the stand 600 without using the correction trajectory data $P_c$. In FIG. 6B, the vertical axis represents the vibration amount of the stand 600 in the X direction, and the horizontal axis represents time.

As illustrated in FIG. 6A, the robot hand body 300 is operated to move 150 mm in the X direction until the time indicated by a dashed-and-dotted line AA, and thereafter, the robot apparatus 100 is stopped until the vibration of the stand 600 ceases. The time indicated by the dashed-and-dotted line AA is approximately 0.9 seconds on the horizontal axis.

In addition, a stop of the vibration of the stand 600 is determined when the peak value of the amplitude of the vibration falls within a range of ±0.25 mm.

In FIG. 6B, the graph indicated by a solid line presents a case of conventional control where the correction mode 1 is not enabled. The graph indicates that, even after the robot apparatus 100 is stopped, the vibration of the stand 600 significantly remain. More specifically, after the operation is stopped, it takes approximately 0.4 second until the peak value of the vibration amount falls within a range of +0.25 mm.

In contrast, in the graph indicated by a dashed line which represents a case where the correction mode 1 is enabled, the vibration of the stand 600 is small after the operation is stopped. Therefore, there is no need to wait until the peak value of the vibration amount is settled within a range of ±0.25 mm.

In addition, FIG. 6B as a whole indicates that operating the robot apparatus 100 using the correction mode 1 can result in a smaller peak value of the vibration amount, compared to the case where the conventional control is used.

Thus, the vibration of the stand 600 itself can be reduced by using the correction mode 1. For example, in a case where the image capturing apparatus captures an image of a workpiece conveyed by the robot apparatus 100, there is no need to wait until the vibration of the stand 600 ceases to avoid blurring in the captured image. Thus, the cycle time can be improved.

Next, the correction mode 2 will be described in detail.

FIG. 7A is a diagram illustrating a comparison made between a change in the driving of the robot hand body 300 over time when the robot apparatus 100 is operated by using correction trajectory data $P_c$ corrected in the correction mode 2 according to the present exemplary embodiment and a change in the driving of the robot hand body 300 over time without using the correction trajectory data $P_c$. A graph indicated by a solid line represents a case where the correction mode 2 is not used, and a graph indicated by a dashed line represents a case where the correction mode 2 is used. In FIG. 7A, the vertical axis represents the driving amount of the robot hand body 300 in the X direction, and the horizontal axis represents time.

FIG. 7B is a diagram illustrating a comparison made between the vibration amount of the stand 600 when the robot apparatus 100 is operated by using correction trajectory data $P_c$ corrected in the correction mode 2 according to the present exemplary embodiment and a vibration amount of the stand 600 without using the correction trajectory data $P_c$. In FIG. 7B, the vertical axis represents the vibration amount of the stand 600 in the X direction, and the horizontal axis represents time.

FIG. 7A illustrates the driving amount in the X direction of the robot hand body 300 when the robot hand body 300 is operated to move 50 mm in the Z direction.

In the graph indicated by a solid line in FIG. 7A, i.e., in the graph representing a case where the correction mode 2 is not used but conventional control is used, the robot hand body 300 is not operated in the X direction.

However, in the graph indicated by a dashed line in the FIG. 7A, i.e., in the graph representing a case where the correction mode 2 is used, the robot hand body 300 is operated in the X direction, and a correction operation is performed to maintain the relative position between the stand 600 and the robot hand body 300.

In the present exemplary embodiment, for the accuracy of the operation, the peak value of the amount of the relative vibration between the stand 600 and the robot hand body 300 needs to fall within a range of ±0.1 mm at all times.

As illustrated in FIG. 7B, in the graph indicated by a solid line represents a case where conventional control is used, the amount of the relative vibration between the stand 600 and the robot hand body 300 is large, and the peak value of the relative vibration amount is not within the range of ±0.1 mm.

Thus, the robot apparatus 100 needs to be operated at slower speed in order to keep the peak value of the relative vibration amount within the range of ±0.1 mm.

In contrast, in the graph indicated by a dashed line in FIG. 7B represents a case where the correction mode 2 is used, the peak value of the amount of the relative vibration between the stand 600 and the robot hand body 300 is kept within the range of ±0.1 mm at all times.

Therefore, even if the robot apparatus 100 is operated at high speed, the relative position between the stand 600 and the robot hand body 300 can be maintained. Consequently, the relative position between the workpieces can be also maintained, and it is thus possible to assemble the products without reducing the operational speed.

In the present exemplary embodiment, the advantageous effects have been described by mainly using the operations of the robot apparatus 100 regarding the image capturing of the workpiece conveyed and the assembly of the workpiece as examples. However, the accuracy in other operations can also be improved.

For example, even in a case where the robot apparatus 100 holding a tool such as a screwdriver performs an operation such as tightening a screw on a workpiece placed on the stand 600, since the relative position between the tool and the workpiece can be maintained in the correction mode 2, failure in screw tightening can be reduced.

In addition, in a case where the robot apparatus 100 holding a jig tool for polishing or the like performs an operation such as polishing a workpiece placed on the stand 600, since the relative position between the tool and the workpiece can be maintained in the correction mode 2, accurate polishing can be performed.

Hereinafter, a second exemplary embodiment Till be described. In the above First exemplary embodiment, when the correction trajectory data $P_c$ is generated in the correction mode 1 or the correction mode 2, the set model data of the stand 600 is used without making any change. However, since there is a limit in modeling the stand 600, a difference between the actual stand 600 and the model data thereof can occur.

In the present exemplary embodiment, a method for effectively reducing vibration of a stand 600 with good accuracy, even if such a difference in the modeling occurs, will be described.

Differences in the configurations of the hardware and the control system from those of the first exemplary embodiment will be described below with reference to the drawing. Since the parts similar to those in the first exemplary embodiment are assumed to have the similar configurations and functions to those described above, the detailed descriptions thereof will be omitted.

Figure 8:
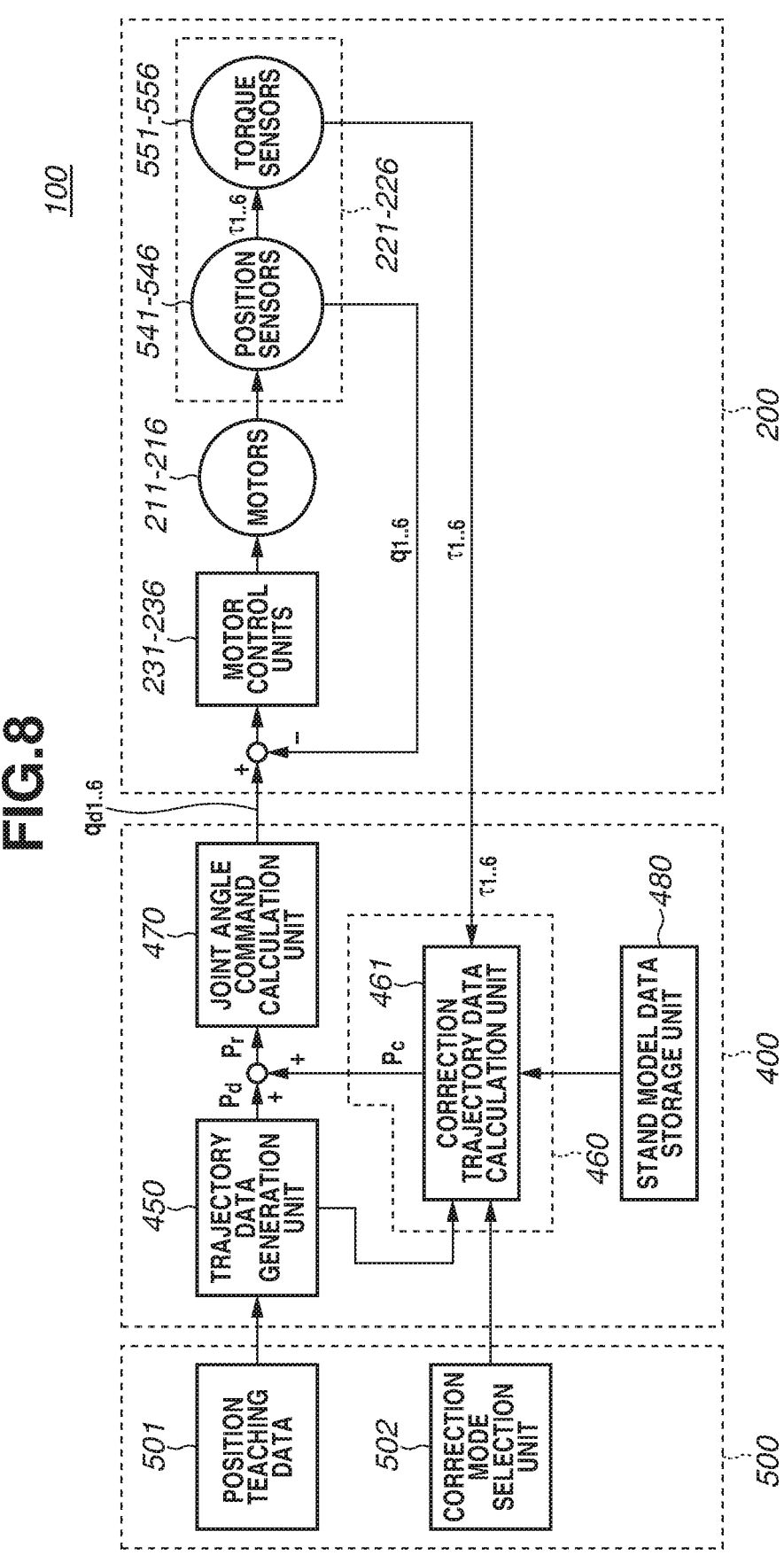
FIG. 8 illustrates a control block diagram of a robot apparatus according to a second exemplary embodiment.

FIG. 8 illustrates a control block diagram of a robot apparatus 100 according to the present exemplary embodiment. The second exemplary embodiment differs from the first exemplary embodiment in that results of detection performed by torque sensors 551 to 556 in sensor units 221 to 226 are input to a correction trajectory data calculation unit 461.

By operating a robot arm body 200 based on correction trajectory data $P_c$ generated, torque applied to joints $J_1$ to $J_6$ is detected by the torque sensors 551 to 556.

At this point, from the correction trajectory data $P_c$ for each of the joints $J_1$ to $J_6$, which is input to a joint angle command calculation unit 470, an individual torque value generated at each of the joints $J_1$ to $J_6$ by an operation of a corresponding one of servomotors 211 to 216 can be calculated.

Next, from a difference between the individual torque value calculated and the individual torque value detected by the corresponding one of the torque sensors 551 to 556, a torque value of each of the joints $J_1$ to $J_6$ generated by the vibration of the stand 600 can be calculated.

From the torque values of the joints $J_1$ to $J_6$ generated by the vibration of the stand 600, force applied to the stand 600 by using the model of the robot apparatus 100 can be calculated. As a result, the vibration amount of the stand 600 can be calculated.

The model data of the stand 600 is modified such that a difference between the vibration amount calculated based on the detection results by the torque sensors 551 to 556 and the vibration amount calculated with the model data of the stand 600 is reduced. In this way, the accuracy of the model data of the stand 600 can be improved.

As a result, the deterioration in the model data accuracy caused by a difference in the modeling can be reduced, and the vibration generated on the stand 600 can be reduced more effectively in each correction mode.

In the present exemplary embodiment, although the model data of the stand 600 is modified by using the detection results by the torque sensors, the configuration is not limited thereto. For example, a detection unit configured to detect the vibration of the stand 600, such as a position sensor or force sensor that is provided at the end portion of the robot arm body 200 to detect load applied to the robot apparatus 100, may be used as appropriate. The force sensor is an example of a load detection unit.

In addition, only one of the above detection units may be used, two of the above detection units may be combined and used, or all of the above detection units may be combined and used.

Hereinafter, a third exemplary embodiment will be described. In the above first and second exemplary embodiments, a case where the vibration on the stand 600 is generated by the robot apparatus 100 has been described. However, there are cases where a production site is equipped with an apparatus, other than a robot apparatus, which can be a source of vibration in a stand. Examples of such apparatus include a conveyor belt that automatically conveys workpieces and a part feeder that delivers workpieces.

In the present exemplary embodiment, a description will be given in detail to a method for effectively reducing the vibration generated on the stand 600 even in a case where an apparatus that can be a source of the vibration, other than a robot apparatus 100, is provided on a stand 600 as described above.

The configurations of the hardware and the control system different from those of the first and second exemplary embodiments will be described below with reference to the drawing. Since the parts similar to those in the first and second exemplary embodiments are assumed to have the similar configurations and functions to those described above, the detailed descriptions thereof will be omitted.

In the present exemplary embodiment, the apparatus other than the robot apparatus 100, such as a conveyor belt and a part feeder, is placed on a work table 602 of the stand 600 and generates vibration on the stand 600. Consequently, the stand 600 vibrates when such apparatus is operated.

A correction trajectory data calculation unit 461 generates correction trajectory data $P_c$ in each correction mode based on an amount of the vibration of the stand 600, which is obtained from a physical model of the stand 600.

More specifically, the amount of the vibration to be generated on the stand 600 when the apparatus placed on the work table 602 is operated is estimated from model data of the apparatus.

The correction trajectory data $P_c$ is calculated based on the vibration amount generated by the robot apparatus 100 and the vibration amount generated on the stand 600 when the apparatus other than the robot apparatus 100 which is placed on the work table 602 is operated.

In this way, even if the apparatus other than the robot apparatus 100 which can generate vibration on the stand 600 is placed on the stand 600, the vibration generated on the stand 600 can be effectively reduced.

In addition, in the present exemplary embodiment, the correction trajectory data $P_c$ may be generated by estimating residual vibration generated at the stand 600 based on an idea similar to the above idea of reducing the impact of the vibration of the stand 600 in the case where the vibration is generated when the apparatus other than the robot apparatus 100 which is placed on the work table 602 is operated.

In the exemplary embodiments described above, specifically, the control apparatus 400 performs the various processing procedures. However, a software control program capable of executing the above-described functions and a recording medium in which the program is recorded may be installed in the external input apparatus 500 to be executed.

Thus, the software control program capable of executing the above-described functions and the recording medium holding the program therein are part of the present disclosure.

In addition, in the above exemplary embodiments, the computer-readable storage medium is the ROM or the RAM, and the control program is stored in the ROM or the RAM. However, the configuration is not limited thereto.

The control program for implementing the exemplary embodiments may be stored in any type of storage medium, as long as the storage medium is a computer-readable storage medium. For example, an HDD, an external storage apparatus, a recording disk, or the like may be used as the storage medium for supplying the control program.

Other Embodiments

Embodiment(s) of the present disclosure can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the exemplary embodiments described above, the robot apparatus 100 has the articulated robot arm having the plurality of joints. However, the number of joints is not limited to this example. While the robot apparatus 100 has a vertical multi-axis configuration as the form of the joints, a robot apparatus having a different form of the joints, such as a horizontal multi-axis configuration and a parallel link mechanism can also implement a configuration equivalent to the above.

In addition, the examples of the configuration of the robot apparatus 100 have been described with reference to the exemplary diagrams illustrated in the attached drawings in accordance with the corresponding exemplary embodiments. However, these are only examples, and the design can be changed arbitrarily by those skilled in the art. In addition, the individual motors provided in the robot apparatus 100 are not limited to the above-described configuration A device such as an artificial muscle may serve as the driving source that drives each of the joints.

Figure 9:
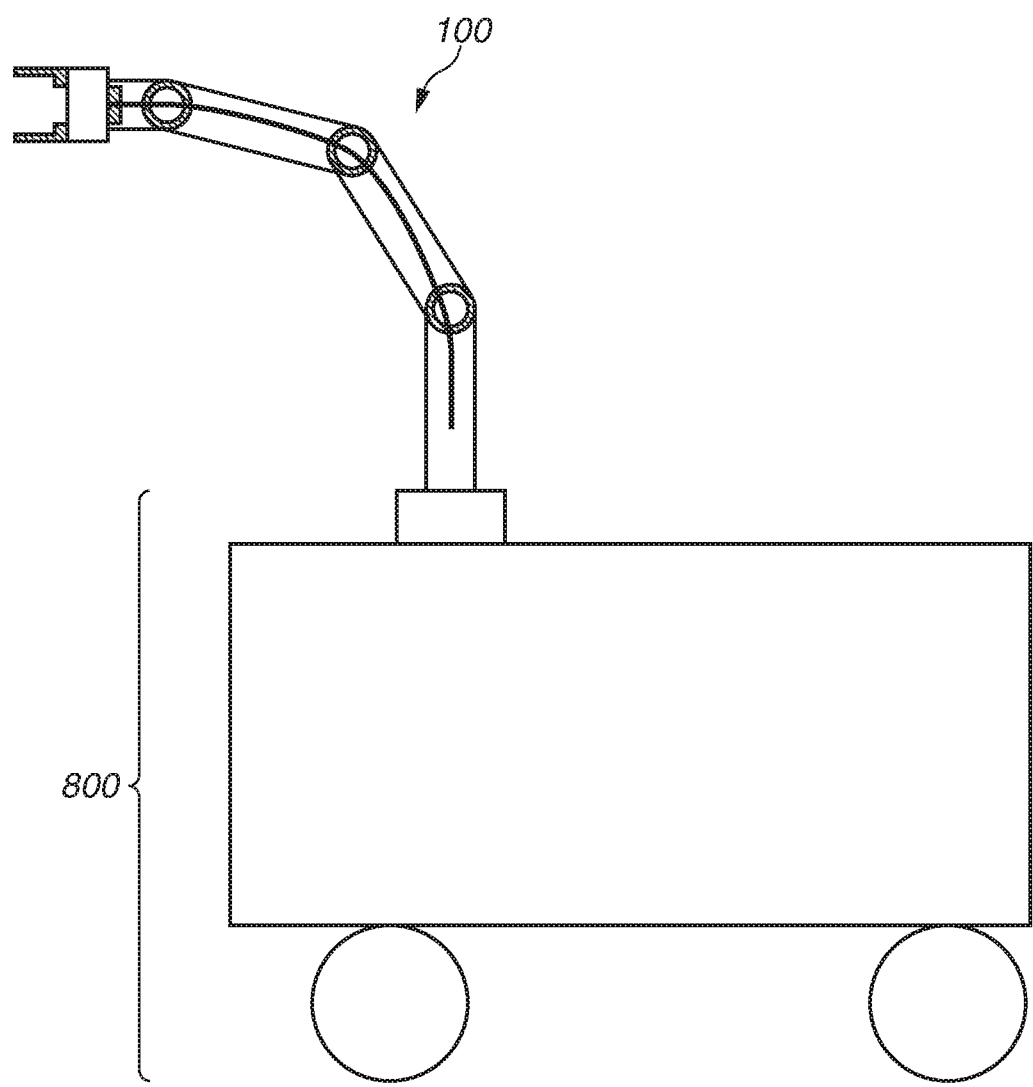
FIG. 9 is a schematic diagram of a robot apparatus according to the other exemplary embodiments.

In addition, the present disclosure is applicable to a case where the robot apparatus 100 is mounted on a movable carriage 800, for example, on an automatic guide vehicle (AGV) as illustrated in FIG. 9. In this case, an elastic coefficient of the entire carriage 800, a viscosity coefficient of the entire carriage 800, a mass component value of the entire carriage 800, an installation orientation of the robot apparatus 100, a speed of the entire carriage 800, etc. are stored in advance as model data of the carriage 800. In this way, the vibration caused by an operation of the carriage 800 can be calculated, and the vibration can effectively be reduced as in the above-described exemplary embodiments.

In addition, in the various exemplary embodiments described above, the robot apparatus 100 is attached to the stand 600 in such a manner that the robot apparatus 100 is suspended from the top plate of the stand 600. However, the configuration is not limited thereto. For example, the robot apparatus 100 may be attached to the stand 600 in a reverse orientation from the orientation when suspended from the ceiling of the stand 600. Alternatively, the robot apparatus 100 may be hung on a wall. In addition, the stand 600 itself may be movable. Alternatively, a portion of the stand 600 may be movable, and the robot apparatus 100 may be placed on the portion.

In addition, the exemplary embodiments described above are applicable to a machine that can automatically perform an operation such as extending and contracting, bending and stretching, moving upward and downward, moving leftward and rightward, turning, or a combined operation of these operations based on the information stored in the storage apparatus included in the control apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-235920, filed Dec. 17, 2018, and No. 2019-197994, filed Oct. 30, 2019, which are hereby incorporated by reference herein in their entirety.

What is claimed is:

1. A robot apparatus provided on a predetermined apparatus, the robot apparatus comprising:
a control apparatus configured to control the robot apparatus,
wherein the control apparatus calculates, based on pre-stored model data that includes one or more mechanical properties of the predetermined apparatus and trajectory data for the robot apparatus, a simulated amount of vibration to be generated on the predetermined apparatus if the robot apparatus were to be operated in accordance with the trajectory data, and the control apparatus
generates corrected trajectory data in response to a determination that the simulated amount of vibration exceeds a threshold value, the corrected trajectory being generated based on the simulated amount of vibration to reduces the amount of vibration on the predetermined apparatus when the robot apparatus is operated; and
controls the robot apparatus to operate using the corrected trajectory data.

2. The robot apparatus according to claim 1, wherein the trajectory data which is used to calculate the vibration is a first trajectory data, the control apparatus generates the corrected trajectory data by correcting the first trajectory data into a second trajectory data such that a relative position between a predetermined portion of the robot apparatus and a portion of the predetermined apparatus is maintained when the robot apparatus is to be operated in accordance with the second trajectory data.

3. The robot apparatus according to claim 2,
wherein the robot apparatus includes an end effector for interacting with target object,
wherein the predetermined apparatus includes a placement table on which the target object is placed,
wherein the predetermined portion of the robot apparatus is the end effector, and
wherein the portion of the predetermined apparatus is the placement table.

4. The robot apparatus according to claim 1, wherein the control apparatus calculates force applied to the predetermined apparatus based on the trajectory data and the pre-stored model data and generates corrected trajectory data such that the vibration generated on the predetermined apparatus is reduced based on the force applied to the predetermined apparatus.

5. The robot apparatus according to claim 1,
wherein the control apparatus is controlled to operate in:
a first correction mode in which the control apparatus calculates force applied to the predetermined apparatus based on the trajectory data and the pre-stored model data and corrects the trajectory data such that the vibration generated on the predetermined apparatus is reduced based on the force applied to the predetermined apparatus; or
a second correction mode in which the control apparatus corrects the trajectory data such that a relative position between a predetermined portion of the robot apparatus and the predetermined apparatus is maintained, and
wherein, when the control apparatus corrects the trajectory data, the control apparatus selects either the first correction mode or the second correction mode based on a content of an operation of the robot apparatus.

6. The robot apparatus according to claim 5,
wherein, when a type of the trajectory data is set as conveyance of a target object, the control apparatus corrects the trajectory data in the first correction mode, and
wherein, in a case where a type of the trajectory data is set as assembly of a target object, the control apparatus corrects the trajectory data in the second correction mode.

7. The robot apparatus according to claim 1, further comprising a detection unit configured to detect vibration of the predetermined apparatus,
wherein the pre-stored model data is modified by the control apparatus based on a result of the detection by the detection unit.

8. The robot apparatus according to claim 7,
wherein the detection unit is at least one of:
a position detection unit configured to detect position information about a part that constitutes the robot apparatus;

a load detection unit configured to detect load applied to a part that constitutes the robot apparatus; and a torque detection unit configured to detect torque applied to a part that constitutes the robot apparatus.

9. The robot apparatus according to claim 1, wherein, when the control apparatus corrects the trajectory data, the control apparatus calculates residual vibration generated on the predetermined apparatus and corrects the trajectory data based on the residual vibration.

10. The robot apparatus according to claim 1,
wherein the predetermined apparatus includes a mechanism other than the robot apparatus, and
wherein, when the control apparatus corrects the trajectory data, the control apparatus calculates the vibration to be generated on the predetermined apparatus by an operation of the mechanism based on model data of the mechanism and corrects the trajectory data based on the calculated vibration of the predetermined apparatus.

11. The robot apparatus according to claim 1, wherein the robot apparatus is mounted in a suspended manner in the predetermined apparatus.

12. The robot apparatus according to claim 1, wherein the predetermined apparatus is movable.

13. The robot apparatus according to claim 1, wherein the predetermined apparatus has a portion that deforms by an operation of the robot apparatus.

14. The robot apparatus according to claim 1,
wherein the model data includes at least one of:
an elastic coefficient of the predetermined apparatus;
a viscosity coefficient of the predetermined apparatus;
a mass component value of the predetermined apparatus; and
an installation orientation of the robot apparatus to the predetermined apparatus.

15. The robot apparatus according to claim 1,
wherein the control apparatus calculates the vibration in advance to operate the robot apparatus.

16. The robot apparatus according to claim 1 wherein the pre-stored model data includes orientation information identifying an orientation that the robot apparatus is mounted on the predetermined apparatus, and the control apparatus calculates the vibration on the predetermined apparatus based on both the one or more mechanical properties of the predetermined apparatus and the orientation information.

17. A robot system in which a robot apparatus is provided on a predetermined apparatus, the robot system comprising:
a control apparatus configured to control the robot apparatus; and
a detection unit configured to detect an operation of the robot apparatus, wherein the control apparatus calculates, based on pre-stored model data that includes one or more mechanical properties of the predetermined apparatus and trajectory data for the robot apparatus, a simulated amount of vibration to be generated on the predetermined apparatus if the robot apparatus were to be operated in accordance with the trajectory data, and the control apparatus generates corrected trajectory data in response to a determination that the simulated amount of vibration exceeds a threshold value, the corrected trajectory being generated based on the simulated amount of vibration to reduces the amount of vibration on the predetermined apparatus when the robot apparatus is operated; and
controls the robot apparatus to operate using the corrected trajectory data.

18. A control method for controlling a robot apparatus provided on a predetermined apparatus, the robot apparatus being controlled by a control apparatus, the control method comprising:
calculating, by the control apparatus, based on pre-stored model data that includes one or more mechanical properties of the predetermined apparatus and trajectory data for the robot apparatus, a simulated amount of vibration to be generated on the predetermined apparatus if the robot apparatus were to be operated in accordance with the trajectory data, and the control apparatus;
generating corrected trajectory data in response to a determination that the simulated amount of vibration exceeds a threshold value, the corrected trajectory being generated based on the simulated amount of vibration to reduces the amount of vibration on the predetermined apparatus when the robot apparatus is operated; and
causing the control apparatus to operate the robot apparatus using the corrected trajectory data.

19. A non-transitory computer-readable storage medium that stores a control program for executing the control method according to claim 18.

20. A product manufacturing method using a robot apparatus provided on a predetermined apparatus, the robot apparatus being controlled by a control apparatus, the product manufacturing method comprising:
calculating, by the control apparatus, a simulated amount of vibration generated on the predetermined apparatus based on pre-stored model data that includes one or more mechanical properties of the predetermined apparatus and trajectory data for the robot apparatus, wherein the simulated amount of vibration is calculated based on the robot apparatus being operated in accordance with the trajectory data;
generating corrected trajectory data in response to a determination that the simulated amount of vibration exceeds a threshold value, the corrected trajectory being generated based on the simulated amount of vibration to reduces the amount of vibration on the predetermined apparatus when the robot apparatus is operated; and
manufacturing a product by causing the control apparatus to control the robot apparatus using the corrected trajectory data.

* * * * *